United States Patent [19]
Wachi et al.

[11] Patent Number: 6,026,489
[45] Date of Patent: *Feb. 15, 2000

[54] SIGNAL PROCESSOR CAPABLE OF EXECUTING MICROPROGRAMS WITH DIFFERENT STEP SIZES

[75] Inventors: Masatada Wachi; Mitsuru Fukui; Mitsumi Kato, all of Hamamatsu, Japan

[73] Assignee: Yamaha Corporation, Hamamatsu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/427,800

[22] Filed: Apr. 26, 1995

[30] Foreign Application Priority Data

Apr. 27, 1994 [JP] Japan .................................... 6-112219

[51] Int. Cl.$^7$ ...................................................... G06F 17/20
[52] U.S. Cl. .......................... 712/241; 712/246; 712/247; 708/315; 708/311; 713/600
[58] Field of Search ..................................... 395/588, 595, 395/596, 597, 598, 375, 724.13; 364/724.13; 712/241, 246, 245, 247; 708/315, 311; 713/600

[56] References Cited

U.S. PATENT DOCUMENTS

| | | | |
|---|---|---|---|
| 4,792,892 | 12/1988 | Mary et al. | 395/375 |
| 5,511,207 | 4/1996 | Ohde et al. | 395/800 |
| 5,687,105 | 11/1997 | Miyamori et al. | 364/724.13 |

FOREIGN PATENT DOCUMENTS

| | | |
|---|---|---|
| 4-130575 | 5/1992 | Japan . |
| 6-12069 | 1/1994 | Japan . |
| 6-195073 | 7/1994 | Japan . |

OTHER PUBLICATIONS

Concha et al. (I.B.M. Technical Discloser Bulletin) vol. 32 No. B58, pp. 403–404, Sep. 1989.

*Primary Examiner*—Meng-Ai T. An
*Assistant Examiner*—Gautam R. Patel
*Attorney, Agent, or Firm*—Graham & James LLP

[57] ABSTRACT

A signal processor stores at least one microprogram having m steps in total smaller in number than n steps which are to be executed within one sampling repetition period. A count corresponding to each of the n steps are generated. M steps of the at least one microprogram stored is executed a plurality of times within the one sampling repetition period to thereby execute the n steps.

10 Claims, 9 Drawing Sheets

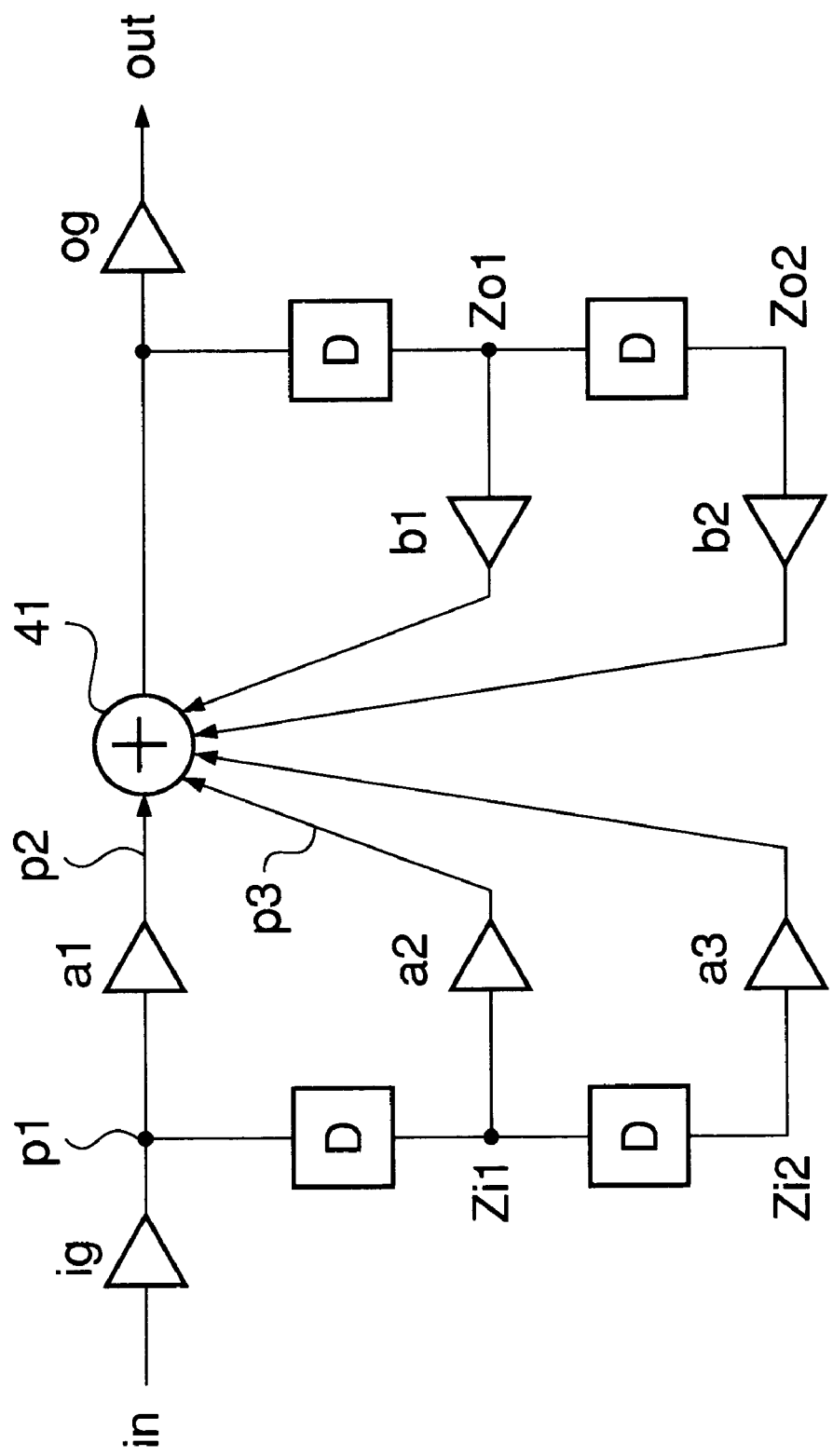

FIG.4A

| STEP | CONTENTS OF MICROPROGRAM REGISTER 21 | DELAY RAM40 W/R |
|---|---|---|
| 0 | Temp=in×ig | MW |
| 1 | Temp=Temp×a1 | |
| 2 | Temp=Temp+Zi1×a2 | MR |
| 3 | Temp=Temp+Zi2×a3 | MR |
| 4 | Temp=Temp+Zo1×b1 | MR |
| 5 | Temp=Temp+Zo2×b2 | MR |
| 6 | Temp=Temp | MW |
| 7 | out =Temp×og | |

FIG.4B

CONTENTS OF ADDRESS REGISTER 24

| ADDRESS | |
|---|---|
| 0 | 0 |
| 1 | - |
| 2 | 1 |
| 3 | 2 |
| 4 | 4 |
| 5 | 5 |
| 6 | 3 |
| 7 | - |
| 8 | 0 |
| 9 | - |
| 10 | 1 |
| ... | 2 |
| | 4 |
| | 5 |
| | 3 |
| | - |
| 255 | ......... |

FIG.4C

CONTENTS OF COEFFICIENT REGISTER 22

$IG_1$, $A_{11}$, $A_{12}$, $A_{13}$, $B_{11}$, $B_{12}$, -, $OG_1$, $IG_2$, $A_{21}$, $A_{22}$, $A_{23}$, $B_{21}$, $B_{22}$, -, $OG_2$, .........

FIG.5A
SAMPLING REPETITION PERIOD
255
OUTPUT FROM OUT1 OF COUNTER 23
0
→TIME
FIG.5B
OUTPUT FROM OUT2 OF COUNTER 23
7
0
→TIME
FIG.5C
31
OUTPUT FROM OUT3 OF COUNTER 23
0
→TIME
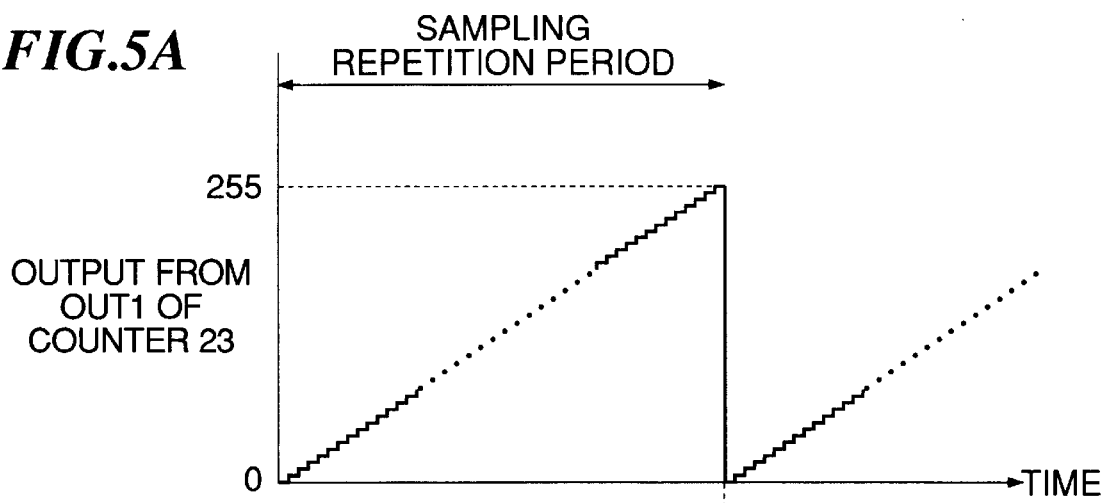
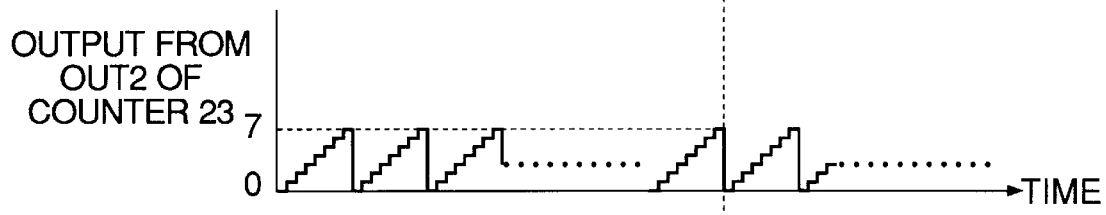
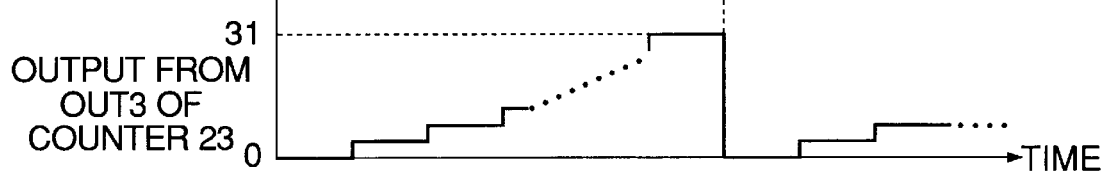

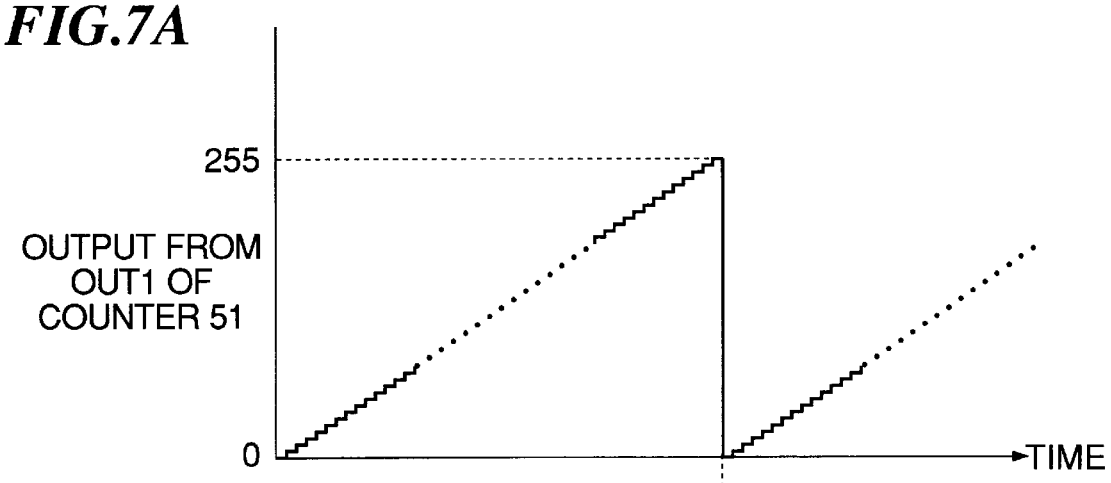
FIG.7A  OUTPUT FROM OUT1 OF COUNTER 51
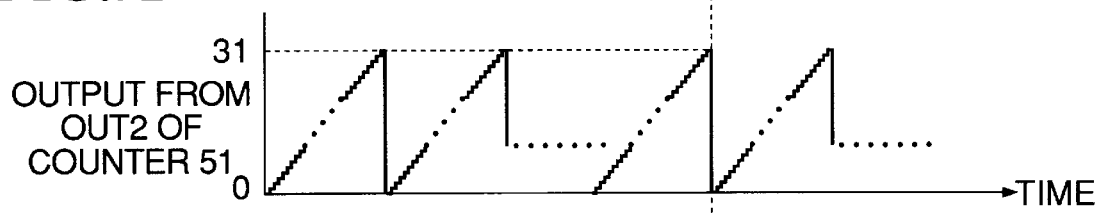
FIG.7B  OUTPUT FROM OUT2 OF COUNTER 51
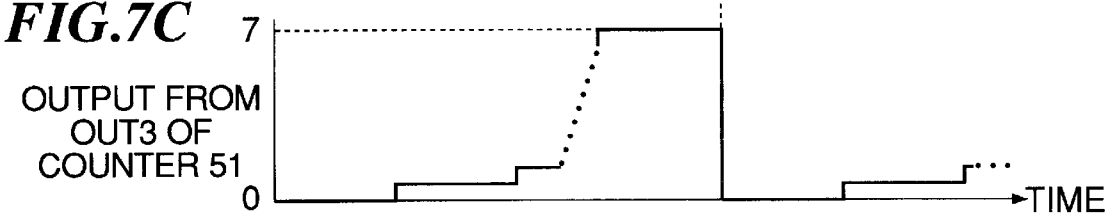
FIG.7C  OUTPUT FROM OUT3 OF COUNTER 51

SIGNAL PROCESSOR CAPABLE OF EXECUTING MICROPROGRAMS WITH DIFFERENT STEP SIZES

BACKGROUND OF THE INVENTION

1. Field of the Invention

This invention relates to a signal processor, and more particularly to a signal processor which is suitable for processing musical tone signals.

2. Prior Art

Conventionally, a DSP (digital signal processor) formed of a stored program-type LSI is used to process musical tone signals. This type of DSP stores a desired microprogram into a microprogram register to carry out various kinds of signal processing according to the microprogram. According to the conventional DSP, the number of steps of the microprogram and the number of steps carried out in one sampling repetition period for signal processing are made equal to each other such that the microprogram is executed once per sampling repetition period. Such a signal processing method is advantageous in having a versatility that the DSP can be used for carrying out various programs ranging from one having a small size to one having a large size.

Further, due to recent progress in the LSI technology, more and more steps can be executed in one sampling repetition period. This makes it possible to carry out a program which is so complicated as was impossible to carry out, as well as to carry out a plurality of programs in parallel with each other.

However, in the conventional DSP, an increase in the number of steps that can be executed in one sampling repetition period brings about an increase in the storage area of the microprogram register, resulting in an increase in the total size of a LSI used therein. This leads to an undesired increase in the manufacturing cost.

Further, an increase in the number of steps that can be executed in one sampling repetition period, i.e. an increase in the number of steps of a program to be stored in the microprogram register is inevitable when it is required to carry out a complicated program which requires execution of the maximum number of steps that can be stored in the microprogram register. However, conventionally, it has also been required to prepare and store a plurality of programs or routines of the same kind into the microprogram register, when it is required to carry out the same processing, based on different kinds of input data, or to carry out the same processing, for a plurality of channels with the DSP being used as part of a tone generator.

SUMMARY OF THE INVENTION

It is an object of the invention to provide a signal processor which is capable of reducing the storage area (address space) of a microprogram register of a DSP realizing the signal processor, to thereby reduce the size of an LSI forming the DSP and hence reduce the manufacturing cost.

To attain the above object, the present invention provides a signal processor comprising:

program storage means for storing at least one microprogram having m steps in total smaller in number than n steps which are to be executed within one sampling repetition period;

counter means for delivering a count corresponding to each of the n steps; and execution means for executing the m steps of the at least one microprogram stored in the program storage means a plurality of times within the one sampling repetition period to thereby execute the n steps.

Preferably, the signal processor includes parameter storage means for storing parameter values to be applied in executing the n steps, respectively.

More preferably, the parameter storage means has a capacity commensurate with the n steps.

Further preferably, the signal processor includes computation result storage means for temporarily storing results of computation obtained during execution of the n steps.

For example, the at least one microprogram having the m steps in total comprises a plurality of microprograms different in size.

Preferably, the at least one microprogram having the m steps in total is supplied from external control means.

More preferably, the signal processor includes designating means for designating a number of times of execution of each of the plurality of microprograms within the one sampling repetition period.

Preferably, the counter means delivers a first count sequentially corresponding to each of the n steps and for designating an address of the parameter storage means, a second count corresponding to each of the m steps and for designating an address of the program storage means, and a third count corresponding to each of a number of times of execution of the m steps and for designating each of a plurality of areas of the computation result storage means.

More preferably, the signal processor includes program size-designating means for designating the number m of the m steps within a predetermined range, and the counter means delivers the second count, depending on the number m designated by the program size-designating means.

The above and other objects, features, and advantages of the invention will become more apparent from the following detailed description taken in conjunction with the accompanying drawings.

BRIEF DESCRIPTION OF THE DRAWINGS

FIG. 3 is a block diagram showing an example of a filter algorithm of signal processing executed by the signal processor according to the first embodiment;

FIG. 4A to FIG. 4C show part of an example of a microprogram realizing the FIG. 3 filter algorithm, in which;

FIG. 4A shows contents of a microprogram register;

FIG. 4B shows contents of an address register; and

FIG. 4C shows contents of a coefficient register;

FIG. 5A shows a change in a count delivered from an output terminal OUT1 of the counter in FIG. 2 with the lapse of time;

FIG. 5B shows a change in a count delivered from an output terminal OUT2 of the counter in FIG. 2 with the lapse of time;

FIG. 5C shows a change in a count delivered from an output terminal OUT3 of the counter in FIG. 2 with the lapse of time;

FIG. 7A shows a change in a count delivered from an output terminal OUT1 of the counter in FIG. 6 with the lapse of time;

FIG. 7B shows a change in a count delivered from an output terminal OUT2 of the counter in FIG. 6 with the lapse of time;

FIG. 7C shows a change in a count delivered from an output terminal OUT3 of the counter in FIG. 6 with the lapse of time;

DETAILED DESCRIPTION

The invention will now be described in detail with reference to drawings showing embodiments of the invention.

Figure 1:
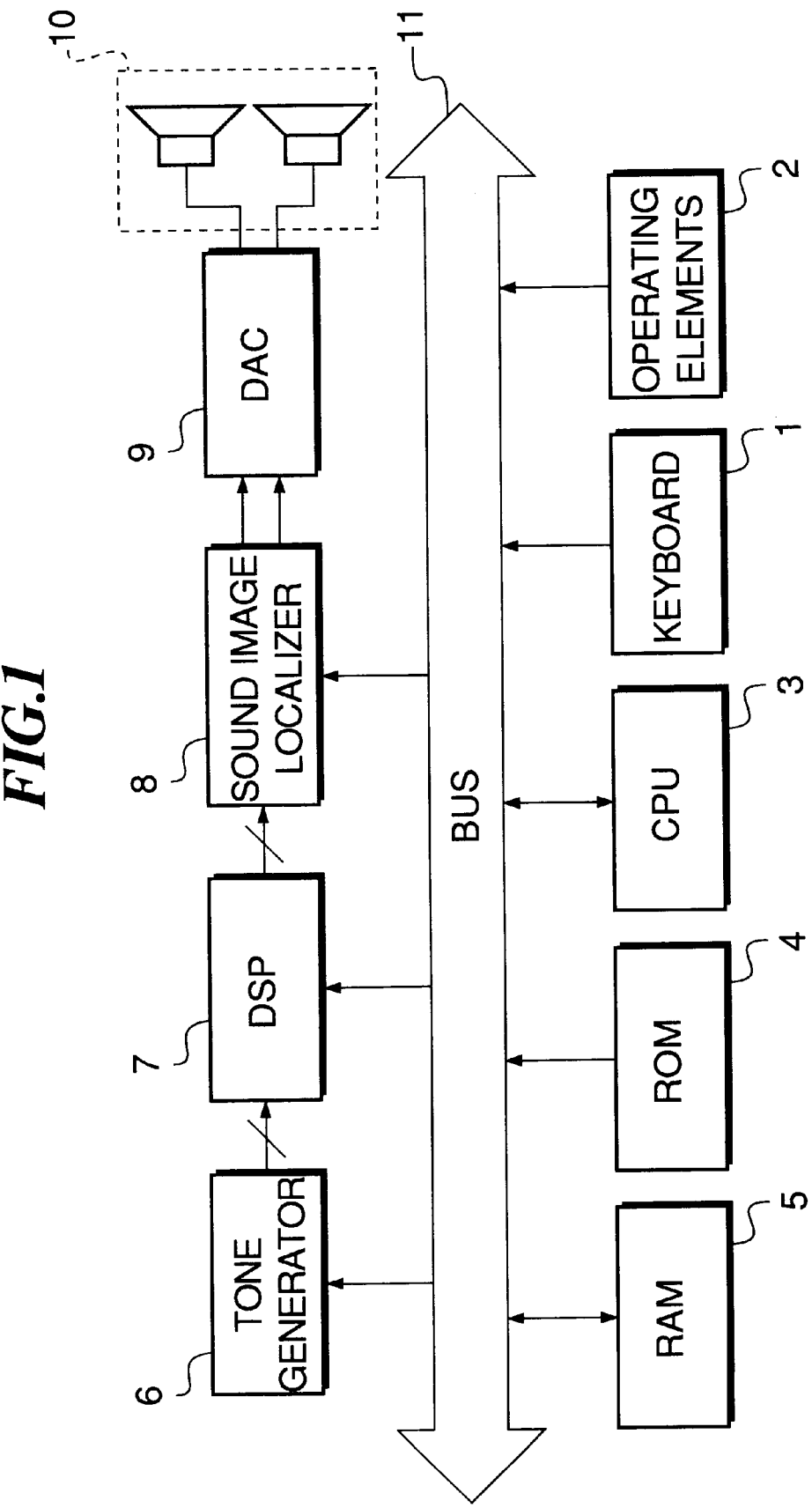
FIG. 1 is a block diagram schematically showing the whole arrangement of an electronic musical instrument incorporating a signal processor according to a first embodiment of the invention.

Referring first to FIG. 1, there is shown the whole arrangement of an electronic musical instrument incorporating a signal processor according to a first embodiment of the invention. The signal processor of the present embodiment is applied e.g. to an effecter.

As shown in FIG. 1, the electronic musical instrument is comprised of a keyboard 1 via which pitch information is input, operating elements 2 via which various kinds of operating control information are input, a CPU 3 for controlling the overall operation of the electronic musical instrument, a ROM 4 storing control programs to be executed by the CPU 3, data of tables, etc., a RAM 5 for temporarily storing various kinds of input information, results of computations, etc., a tone generator 6 for generating musical tone signals in response to the pitch information input thereto from the keyboard 1, a digital signal processor (DSP) 7 as the signal processor for processing musical tone signals from the tone generator 6, a sound image localizer 8 for changing locations of sound images based on the musical tone signals delivered from the DSP 7, a DAC (digital-to-analog converter) for converting the musical tone signals in digital form (digital tone signals) from the sound image localizer into tone signals in analog form (analog tone signals), and loudspeakers 10 for converting the analog tone signals into musical tones.

The above component elements 1 to 8 are connected to each other via a bus 11, with the tone generator 6 being connected to the DSP 7, which in turn is connected to the sound image localizer 8. The sound image localizer 8 is connected to the loudspeakers 10 via the DAC 9.

Figure 2:
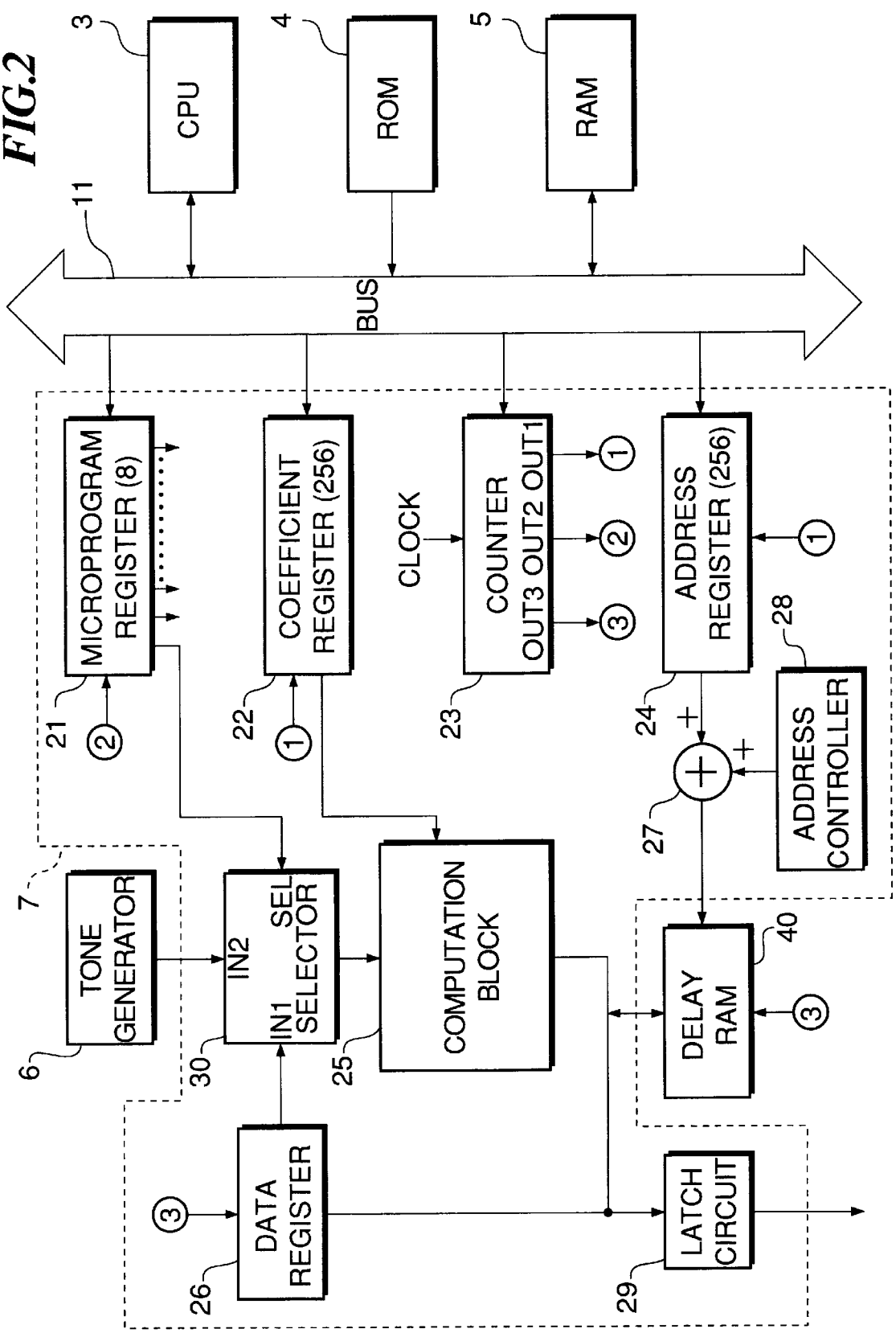
FIG. 2 is a block diagram showing the arrangement of the signal processor appearing in FIG. 1.

FIG. 2 shows details of the construction of the DSP 7 appearing in FIG. 1, together with some of the above component elements other than the DSP 7 being shown as connected thereto for the convenience of explanation.

As shown in FIG. 2, the DSP 7 is mainly comprised of a microprogram register 21 for storing a microprogram having 8 steps, a coefficient register 22 with an 8-bit address space for storing coefficient values in respective register areas thereof which are allotted to respective addresses, a counter 23 for delivering different kinds of counts, an address register 24 with an 8-bit address space for storing address values in respective register areas thereof which are allotted to respective addresses, a computation block 25 for carrying out both addition and multiplication within one operation step, and a data register 26 for storing results of computation. It goes without saying that the capacities or address spaces of the microprogram register 21, the coefficient register 22 and the address register 24 are not limited to the above values.

The microprogram register 21, the coefficient register 22, the counter 23, and the address register 24 are connected to the bus 11, and the operations of these component elements 21 to 24 are controlled by the CPU 3.

The microprogram register 21 has an address input terminal to which is connected an output terminal OUT2 of the counter 23, via which a second kind of count (second count) is supplied to the register 21 from the counter 23. The microprogram stored in the microprogram register 21 is sequentially carried out according to the second count, and a select signal is delivered from the register 21 to each of various selectors (in the present embodiment, only one 30 of them is shown).

The coefficient register 22 has an address input terminal to which is connected an output terminal OUT1 of the counter 23, via which a first kind of count (first count) is supplied to the register 22 from the counter 23. The register 22 delivers a coefficient value stored in an address thereof corresponding to the first count to one input terminal of the computation block 25.

The address register 24 has an address input terminal to which is connected the output terminal OUT1 of the counter 23, and a data output terminal thereof connected to one input terminal of an adder 27. The adder 27 has another input terminal to which is connected an output terminal of an address controller 28. The address controller 28 sequentially decrements an address value corresponding to a location within one of a plurality of areas of a delay RAM 40 by "one" per sampling repetition period, and delivers the updated address value to the adder 27. If the updated value reaches an address value corresponding to the starting address of the area of the delay RAM 40, the address controller 28 delivers, in the following sampling repetition period, an address value corresponding to the ending address of the area. In short, the address controller 28 enables each area of the delay RAM 40 to be used as a ring buffer.

The adder 27 has an output thereof connected to an address input terminal of the delay RAM 40 which is provided outside the DSP 7. Further, connected to the delay RAM 40 are an output terminal OUT3 of the counter 23 as well as the output of the computation block 25 and the input of a latch circuit 29 via a data line connecting therebetween. The delay RAM 40 serves to delay a computation output (tone signal) from the computation block 25 by a predetermined time period by writing data of a tone signal into an address thereof designated by a value output from the adder 27, and reading data thus written from an address which is remote from the aforementioned address by a predetermined address value. This delay can impart various kinds of effects to the musical tone. Further, the whole address space of the delay RAM 40 is divided into a plurality of areas as mentioned above, and each area is selectively utilized according to an output from the output terminal OUT3 of the counter 23. According to the signal processor of the present invention, the microprogram stored in the microprogram register 21 is executed a plurality of times per one sampling repetition period for respective different kinds of signal processing. This makes it possible to avoid the inconvenience that if data of a tone signal is sequentially stored into the same area, the data stored one repetition period earlier cannot be used any longer since it has been replaced by new data, even if it is desired to be used again.

The output terminal OUT3 of the counter 23 is also connected to the input of the data register 26, which in turn has an output thereof connected to one input terminal IN1 of the selector 30. The other input terminal IN2 of the selector 30 is connected to the tone generator 6 appearing in FIG. 1, and the output of the selector 30 is connected to another input terminal of the computation block 25. Further, the selector 30 has a select terminal SEL to which is connected a predetermined one of a plurality of select signal output terminals of the microprogram register 21, and supplied with the aforementioned select signal as described hereinabove. The selector 30 selects either an output from the data register 26 or an output from the tone generator 6 in response to the select signal, and delivers the selected output to the computation block 25. Similarly to the delay RAM 40, the data register 26 has a whole address space thereof divided into a plurality of areas, each area being selectively used according to the output from the output terminal OUT3 of the counter 23.

The control processing carried out by the DSP 7 constructed as above will be described with reference to FIG. 3 to FIG. 5.

FIG. 3 shows an example of an algorithm of the control processing executed by the DSP 7, i.e. a filter algorithm of an IIR filter. In the present embodiment, coefficient values of the IIR filter are changed to form filters having different characteristics. These filters are specifically classified into a low-pass filter (LPF), a high-pass filter (HPF), a band-path filter (BPF), a band-reject filter (BRF), and so on.

In FIG. 3, an input signal in is amplified by an input gain ig, and then divided into two signals, one being amplified by a gain a1 and applied to an adder 41, and the other being delayed by a predetermined time period D to form a delayed signal Zi1. The delayed signal Zi1 is divided into two signals, one being amplified by a gain a2 and applied to the adder 41, and the other being further delayed by the predetermined time period D to form a delayed signal Zi2, which is amplified by a gain a3 and applied to the adder 41.

The output from the adder 41 is divided into two signals, one being amplified by an output gain og to form an output signal out, and the other being delayed by the predetermined time period D to form a delayed signal Zo1. The delayed signal Zo1 is further divided into two signals, one being amplified by a gain b1 and applied to the adder 41, and the other being further delayed by the predetermined time period D to form a delayed signal Zo2. The delayed signal Zo2 is amplified by a gain b2 and applied to the adder 41.

FIG. 4A, FIG. 4B, and FIG. 4C collectively show an example of a microprogram realizing the filter algorithm shown in FIG. 3. FIG. 4A, FIG. 4B, and FIG. 4C show contents of the microprogram register 21, the coefficient register 22, and the address register 24, i.e. data stored therein, respectively. According to FIG. 4A to FIG. 4C, it is possible to realize 32 filters having respective different characteristics at the maximum.

FIG. 5A, FIG. 5B, and FIG. 5C show changes in the three kinds of counts delivered from the counter 23 appearing in FIG. 2, based on which the signal processing is executed by the microprogram shown in FIG. 4A to FIG. 4C. More specifically, FIG. 5A, FIG. 5B, and FIG. 5C show changes in the three kinds of counts delivered from the output terminals OUT1, OUT2, and OUT3 of the counter 23 with the lapse of time, respectively.

First, when "0" is delivered from the output terminals OUT1 to OUT3 of the counter 23, the processing of a step 0 of a microprogram stored in the microprogram register 21, i.e. computation of "Temp=in×ig" is executed.

More specifically, the select signal is delivered from the microprogram register 21 to the selector 30 whereby a signal (signal in) input from the tone generator 6 is delivered to the computation block 25. On the other hand, the output "0" from the output terminal OUT1 of the counter 23 is also applied to the address input terminal of the coefficient register 22, whereby the contents (input gain ig) of a register area (in the FIG. 4C example, IG1) of the coefficient register 22 allotted to an address 0 thereof are delivered to the computation block 25. The computation block 25 carries out computation of "in×ig", and the results of the computation are delivered from the computation block 25 to a temporary register Temp of the data register 26 as one register area thereof for storage therein. In this processing of the step 0, the left side of the equal sign "=" of the computation designates writing processing. In this connection, although the computation block 25 is constructed such that it carries out both addition and multiplication, as described before, the present step 0 does not require addition, and hence in actuality "0" is added to the results of the above multiplication.

Further, as shown in FIG. 4A, W/R control is also incorporated in the microprogram for writing (MW) and reading (MR) into and from the delay RAM 40 appearing in FIG. 2, and hence the results of computation of the computation block 25 are written into the delay RAM 40. The writing address of the delay RAM 40 is designated by the contents ("0") of an address 0 of the address register 24, since the output "0" from the output terminal OUT1 of the counter 23 is also input to the address input terminal of the address register 24. Thus, execution of the step 0 gives a signal at a point p1 in FIG. 3.

Then, the outputs from the output terminals OUT1, OUT2 of the counter 23 are changed to "1", and processing of a step 1 of the microprogram in the register 21, i.e. computation of "Temp=Temp×a1", is carried out.

More specifically, the select signal is delivered from the microprogram register 21 to the selector 30, thereby causing the selector 30 to deliver a signal input from the data register 26. This causes the contents of the temporary register Temp, in which the results of processing of the step 0 are stored, to be read out and delivered to the computation block 25. Further, the contents (gain a1) of a register area $A_{11}$ of the coefficient register 22 allotted to an address 1 thereof are delivered to the other input terminal of the computation block 25. Similarly to the step 0, the computation of "Temp× a1" is carried out, and results of the computation are written into the temporary register Temp. It should be noted again that "Temp" on the right side of the computation at this step of the microprogram designates the processing of reading data from the temporary register Temp of the data register 26. Thus, execution of the step 1 gives a signal at a point p2 in FIG. 3.

Subsequently, when the outputs from the output terminals OUT1, OUT2 of the counter 23 are changed to "2", the processing ("Temp=Temp+Zi1×a2") of a step 2 of the microprogram in the microprogram register 21 is carried out.

That is, similarly to the step 1, after contents of the temporary register Temp (results of calculation of the step 1) are read out and delivered via the selector 30 to the computation block 25, data stored at an address of the delay RAM 40 designated by data ("1") of an address 2 of the address register 24 is read out and delivered to the computation block 25. At the same time, data (gain a2) of a register area $A_{12}$ of the coefficient register 22 allotted to an address 2 thereof is read out and delivered to the computation block 25, whereby the computation of "Temp+Zi1×a2" is executed, and results of the computation are stored into the temporary register Temp of the data register 26. In this connection, the data read out from the delay RAM 40 is results of computation of "in×ig" carried out one sampling repetition period earlier, i.e. results of computation of the step 0 of the microprogram carried out one sampling repetition period earlier. As will be understood from FIG. 3, the signal Zi1 is delayed by the time period D relative to the signal at the point p1, and in the present embodiment, the delay time D corresponds to one sampling repetition period. In this way, execution of the step S2 gives a signal at a point p3.

Further, as the outputs from the output terminals OUT1, OUT2 of the counter 23 are sequentially changed from "3" to "5", a step 3 to a step 5 of the microprogram in the microprogram register 21 are carried out. These steps are identical in processing to the step 2 except that the coefficient register 22 and the address register 24 are addressed differently from the step 2, depending on the output from the output terminal OUT 1 of the address register 24, and description thereof is omitted.

Then, when the outputs from the output terminals OUT1, 2 of the counter 23 are changed to "6", the processing ("Temp=Temp") of a step 6 is carried out. More specifically, contents of the temporary register TEMP, i.e. results of addition of the adder 41 are read out and written into the temporary register Temp again, and at the same time, the same results of addition are written into an address (address 3) of the delay RAM 40 designated by the address register 24. Here, the reason for writing the results of addition into the address 3 of the delay RAM 40 is that according to the filter algorithm of FIG. 3, the signal at the point p1 is required to be delayed only one or two sampling repetition periods, so that it is not necessary to delay the same by three or more sampling repetition periods. The processing of this step is required in the DSP of the present embodiment since the DSP is not capable of executing both writing into and reading from the delay RAM 40 within one step. If the DSP is constructed such that it is capable of both writing in and reading from the delay RAM 40 within one step, the processing of the step 6 is unnecessary.

Further, when the outputs from the output terminals OUT1, 2 of the counter 23 are changed to "7", the processing ("out=Temp×og") of a step 7 is carried out. More specifically, similarly to the step 1, the value (results of addition by the adder 41) stored at the step 6 is read out from the temporary register Temp of the data register 26 and delivered to the computation block 25, and at the same time data of a register area $OG_1$ allotted to an address 7 of the coefficient register 22 is read out and delivered to the computation block 25, where the computation of "Temp× og" is carried out. Then, the results of computation are delivered from the computation block 25 and latched by the latch circuit 29 in FIG. 2.

When a subsequent clock is supplied to the counter 23, the counter 23 delivers "8" from the output terminal OUT1, "0" from the output terminal OUT2, and "1" from the output terminal OUT3, as shown in FIG. 5A to FIG. 5C, respectively. This causes the microprogram in the microprogram register 21 to return to the step 0 to execute the same again. At the same time, the addresses of the coefficient register 22 and the address register 24 from which data are to be read are advanced to 8. Further, the data register 26 changes its area, such as the temporary register Temp, into which data is to be stored, to the next area. This is intended, as described hereinbefore, to allot different areas of the register to respective different types of filters.

Thus, even after all the steps of the microprogram stored in the microprogram register 21 have been carried out, the coefficient register 22 is addressed in a continued manner, whereby all the coefficient values stored in the coefficient register 22 are used within one sampling repetition period, thereby making it possible to execute a plurality kinds of signal processing having respective different output characteristics.

The data register 26 of the present embodiment is constructed such that both writing processing and reading processing can be carried out within one step. More specifically, data can be read from the data register 26 during the first half of one step, and data can be written thereinto during the second half of same. Further, the addressing of the data register 26 is carried out according to the microprogram. For example, if a step of a microprogram for executing computation of "Temp2=Temp1+Zo1×b1" is prepared, data can be read from a temporary register Temp1 of the data register 26 and results of the computation can be written into a temporary register Temp2 of the same. Since the data stored in the temporary register Temp1 is not updated, the data can be also used at subsequent steps. In the present embodiment, the signal processing is carried out by a rather simple program, and hence the temporary register Temp is used in common for writing and reading data. However, in realizing complicated filters, algorithms for the tone generator, algorithms for effecters, and the like, it is required to use a plurality of temporary registers.

As described above, according to the signal processor of the present embodiment, it is possible to realize a plurality of (the maximum of 32) IIR filters which have different characteristics according to the FIG. 3 filter algorithm, by the use of one microprogram consisting of eight steps. This makes it possible to largely reduce the area within the DSP 7 occupied by the microprogram register 21.

According to the present embodiment, the address space of the 8-bit address register 24 accommodates 256 areas similarly to that of the coefficient register 22. As will be understood from FIG. 4B, the data stored at the addresses 0 to 7 of the address register 24 are identical to the data stored at the addresses 8 to 15 of the same, respectively. Therefore, the address space of the address register 24 may be a 4-bit address space so that it accommodates eight areas, and the FIG. 2 configuration may be modified such that the output from the output terminal OUT 2 of the counter 23 is applied to the address input terminal of the address register 24, whereby the area or capacity of the DSP 7 can be further reduced.

Next, a signal processor according to a second embodiment of the invention will be described with reference to FIG. 6 and FIG. 7A to FIG. 7C.

Figure 6:
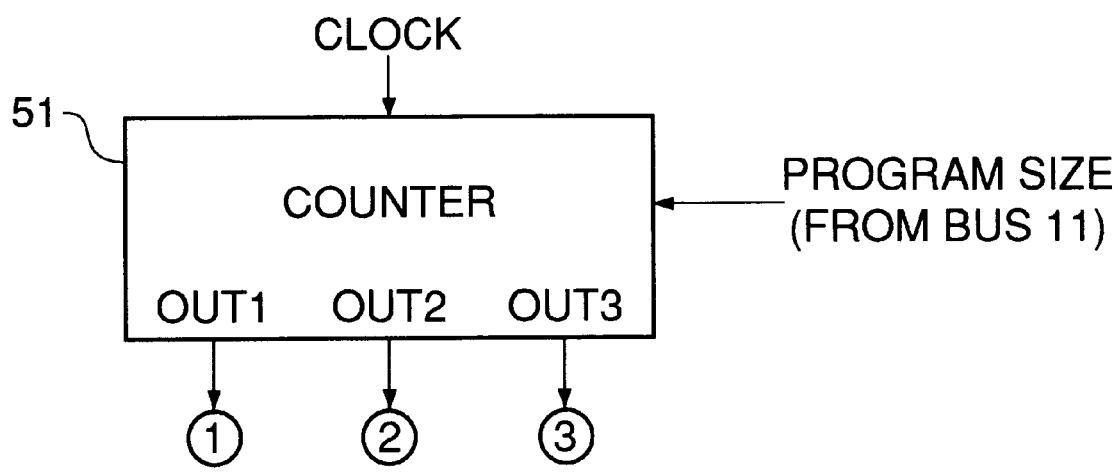
FIG. 6 is a block diagram schematically showing the construction of a counter of a signal processor according to a second embodiment of the invention.

In the first embodiment described above, the step size, i.e. number of steps of a program stored in the microprogram register 21 is fixed (eight in the illustrated example), and values stored in the coefficient register 22 and the address register 24 to be used according to the microprogram are changed to execute various kinds of signal processing. According to the second embodiment, the step size of the microprogram register, i.e. the program size, can be freely changed up to a predetermined value (e.g. 64), and therefore the arrangement of the signal processor of the present embodiment is only distinguished from the first embodiment in the step size of the microprogram register and the construction of the counter. More specifically, in the present embodiment, the counter 23 in FIG. 2 is replaced by a counter 51 as shown in FIG. 6, and the remainder of the arrangement of the second embodiment is identical with that of the first embodiment. A microprogram to be stored into the microprogram register 4 is transferred from a CPU provided outside the signal processor via a bus.

FIG. 6 schematically shows the counter 51, which is distinguished from the counter 23 in FIG. 2, in its internal construction as well as in that information on the step size (program size) is supplied from the CPU to the counter 51 via the bus 11.

Responsive to the information on the program size supplied, the counter 51 selectively delivers a count out of count values of $2^1, 2^2, 3^3, \ldots 2^6$ through its output terminal OUT2, and a count calculated based on the count value thus delivered through the output terminal OUT2, through its output terminal OUT3. The counter 51 for delivering such counts can be easily realized in a known circuit configuration, and hence description of details of the circuit configuration is omitted.

FIG. 7A to FIG. 7C show changes in three kinds of counts delivered from terminals OUT1, OUT2, and OUT3 of the counter 51 with the lapse of time, respectively.

For example, when the signal processor of the present embodiment carries out signal processing according to a microprogram having 32 steps, the CPU 3 supplies information on the program size via the bus 11 to the counter 51. According to the supplied information, the counter 51 delivers count values via the terminals OUT1 to OUT3 as shown in FIG. 7A to FIG. 7C, respectively, whereby the microprogram is executed based on these counts to carry out desired signal processing, similarly to the first embodiment. That is, the microprogram having 32 steps is executed repeatedly eight times within one sampling repetition period.

According to the present embodiment, the program size can be freely changed according to the algorithm which may be either a simple one or a complicated one, and therefore it is possible to realize a signal processor which has higher versatility.

Next, a signal processor according to a third embodiment of the invention will be described with reference to FIG. 8 to FIG. 10C.

Figure 8:
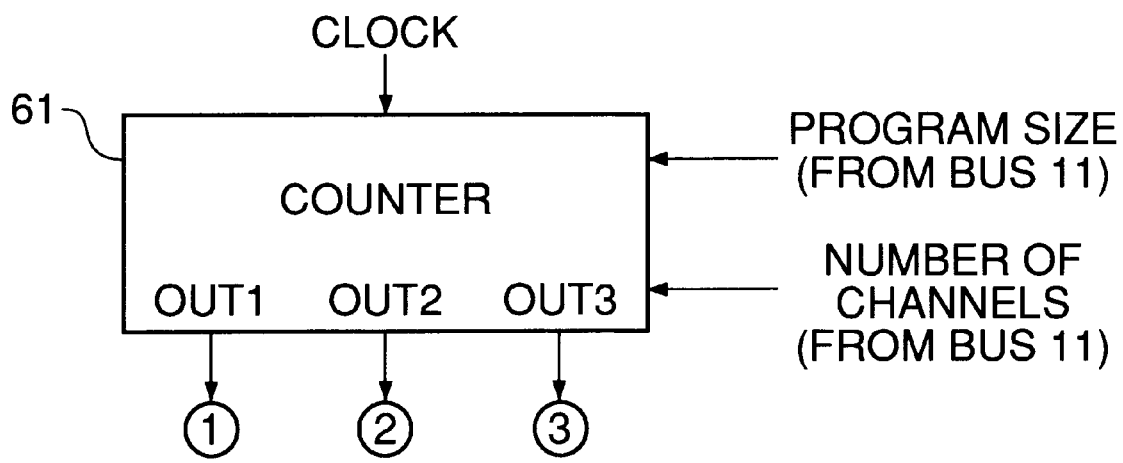
FIG. 8 is a block diagram schematically showing the construction of a counter of a signal processor according to a third embodiment of the invention.

In the second embodiment described above, the signal processor carries out signal processing according to a microprogram having a desired program size within a predetermined size range transferred to a microprogram register. According to the third embodiment, signal processing can be carried out according to a plurality of microprograms having a total program size within a predetermined size range (e.g. 96 steps) transferred to the microprogram register. That is, the arrangement of the signal processor of the present embodiment is only distinguished from the second embodiment in the step size of the microprogram register and the construction of the counter. More specifically, in the present embodiment, the counter 51 shown in FIG. 6 is replaced by a counter 61 as shown in FIG. 8, and the remainder of the arrangement of the signal processor is identical with that of the second embodiment. The maximum program size of the microprogram register is not limited to "96 steps" in the present embodiment, but it may be set as desired, e.g. to "64 steps" as in the second embodiment. Further, in the present embodiment as well, a microprogram to be stored into the microprogram register is transferred from a CPU provided outside the signal processor via a bus.

FIG. 8 schematically shows the counter 61, which is distinguished from the FIG. 6 counter 51, in its internal construction as well as in that information on the number of channels is supplied thereto via the bus 11.

The counter 61 delivers counts from output terminals OUT2, OUT3 according to the program size and the number of channels supplied thereto. The counter 61 for delivering such counts can be easily realized in a known circuit configuration similarly to the second embodiment, and hence description of details of the circuit configuration is omitted.

Figure 9:
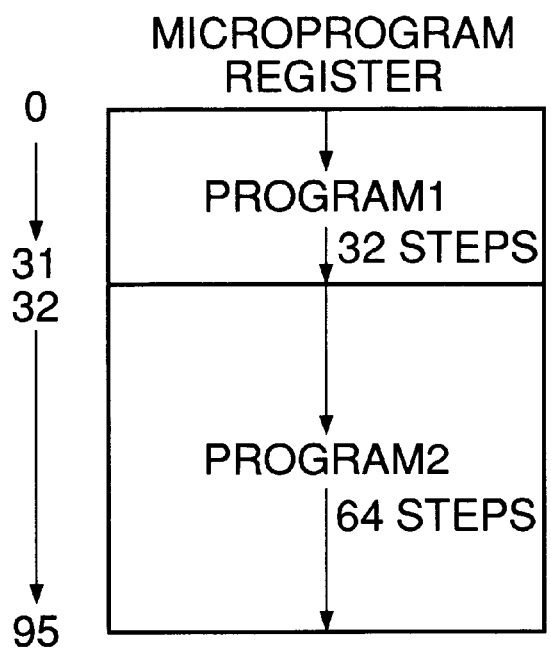
FIG. 9 shows an example of a microprogram stored in a microprogram register of a signal processor according to a third embodiment of the invention.

FIG. 9 shows an example of a microprogram stored in a microprogram register 21, which is formed of a program 1 having 32 steps and a program 2 having 64 steps.

Figure 10A:
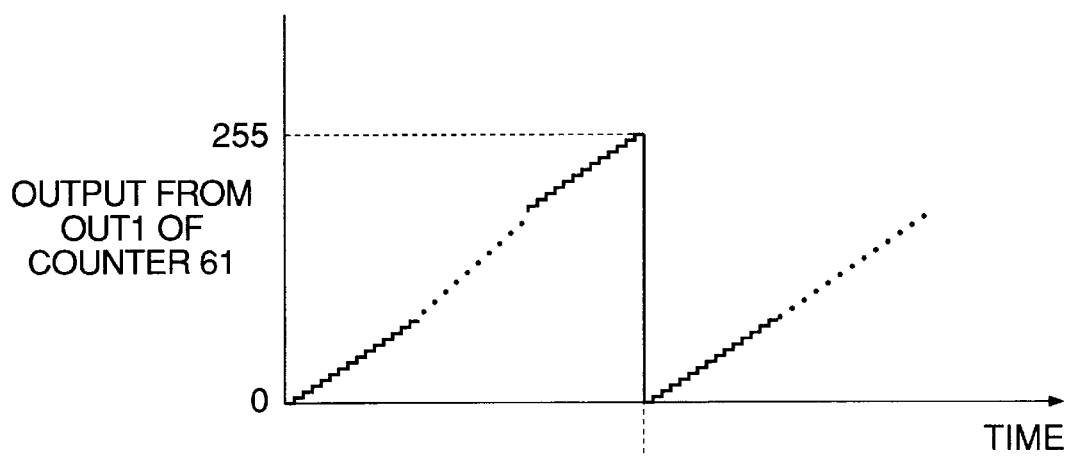
FIG. 10A shows a change in a count delivered from an output terminal OUT1 of the counter in FIG. 8 with the lapse of time.
Figure 10B:
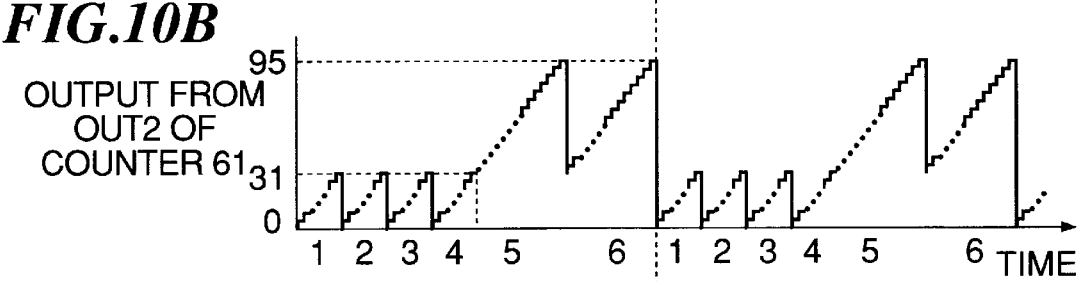
FIG. 10B shows a change in a count delivered from an output terminal OUT2 of the counter in FIG. 8 with the lapse of time.
Figure 10C:
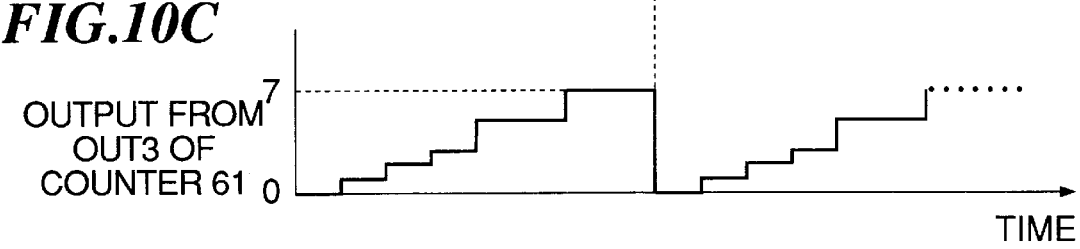
FIG. 10C shows a change in a count delivered from an output terminal OUT3 of the counter in FIG. 8 with the lapse of time.

FIG. 10A to FIG. 10C show changes in three kinds of counts delivered from output terminals OUT1, OUT2, and OUT3 of the counter 61 with the lapse of time, respectively.

For example, the CPU 3 supplies information on the program size and information on the number of channels (information for executing the 32-step program 1 for four channels and the 64-step program 2 for two channels) via the bus 11 to the counter 61. According to the information, the counter 61 delivers count values via the output terminals OUT1 to OUT3 as shown in FIG. 10A to FIG. 10C, and signal processing is executed according to the program 1 four times corresponding to the four channels, and then according to the program 2 two times corresponding to the two channels, based on these counts.

Thus, according to the present embodiment, signal processing may be carried out based on a plurality of programs according to different algorithms, whereby the microprogram register can be efficiently utilized according to algorithms employed.

Although in the embodiments described above, as the signal processing algorithm, filter algorithms are employed, this is not limitative, but various kinds of effecter algorithms, such as reverberation, chorus and distortion, may be employed. Further, a tone generator algorithm may be employed. In such a case, the number of repetition of execution of the microprogram within one sampling repetition period forms the number of tone channels. If such a tone generator algorithm is applied in the second or third embodiment, an efficient tone generator system suitable for desired applications can be realized.

What is claimed is:

1. A signal processor receiving in sequence a plurality of discrete signals to be processed, a time period between each signal being a sampling repetition period, the signal processor comprising:

program storage means for storing at least one microprogram having m steps, said m steps being smaller in number than n steps which are to be executed within one sampling repetition period said at least one microprogram being supplied from an external source;

counter means for delivering a count corresponding to each of said n steps; and program size-designating means for designating the value of m within a predetermined range, wherein m is greater than 1;

execution means for executing said m steps of said at least one microprogram stored in said program storage means a plurality of times in order within said one sampling repetition period to thereby execute said n steps;

wherein the signals to be processed are sound signals, the processor including storage means for storing values of at least one parameter to be applied in executing respective ones of said n steps, wherein each step of said at least one microprogram executes at least one algorithm on a received signal using a corresponding one of said stored parameter values.

2. A signal processor according to claim 1, wherein said parameter storage means has a capacity commensurate with said n steps.

3. A signal processor according to claim 2, including computation result storage means for temporarily storing results of computation obtained during execution of said n steps.

4. A signal processor according to claim 3, wherein said counter means delivers a first count sequentially corresponding to each of said n steps and for designating an address of said parameter storage means, a second count corresponding to each of said m steps and for designating an address of said program storage means, and a third count corresponding to each of a number of times of execution of said m steps and for designating each of a plurality of areas of said computation result storage means.

5. A signal processor according to claim 4, wherein said counter means delivers said second count, depending on the number m designated by said program size-designating means.

6. A signal processor receiving in sequence a plurality of discrete signals to be processed, a time period between each signal being a sampling repetition period, the processor comprising:

program storage means for storing a plurality of microprograms each having m steps, wherein m is greater than 1, said m steps being different in number between said plurality of microprograms and smaller in number than n steps which are to be executed within one sampling repetition period;

designating means for designating a number of times of execution of each of said plurality of microprograms within said one sampling repetition period;

counter means for delivering a count corresponding to each of said n steps; and execution means for executing said m steps of each of said plurality of microprograms stored in said program storage means in order said number of times of execution designated by said designating means such that a total number of times of execution of steps of said plurality of microprograms within said one sampling repetition period is equal in number to said n steps to thereby execute said n steps;

wherein the signals are sound signals, the processor including storage means for storing values of at least one parameter to be applied in executing respective ones of said n steps in processing the received signals, wherein each step of said at least one microprogram executes a predetermined algorithm for processing a received signal using a corresponding one of said stored parameter values.

7. A signal processor according to claim 6, wherein said storage means has a capacity commensurate with said n steps.

8. A signal processor according to claim 7, including computation result storage means for temporarily storing results of computation obtained during execution of said n steps.

9. A signal processor according to claim 8, wherein said counter means delivers a first count sequentially corresponding to each of said n steps and for designating an address of said storage means, a second count corresponding to each of said m steps and for designating an address of said program storage means, and a third count corresponding to each of a number of times of execution of said m steps and for designating each of a plurality of areas of said computation result storage means.

10. A signal processor receiving in sequence a plurality of discrete sound signals to be processed, a time period between each signal being a sampling repetition period, the signal processor comprising:

program storage means for storing at least one microprogram having m steps, said m steps being smaller in number than n steps which are to be executed within one sampling repetition period with respect to each of said received sound signals, said at least one microprogram being supplied from external control means;

program size-designating means for designating the number m of said m steps within a predetermined range in response to program size information supplied from said external control means wherein m is greater than 1;

execution means for executing said m steps of said at least one microprogram stored in said program storage means a plurality of times in order within said one sampling repetition period to thereby execute said n steps.

* * * * *